(No Model.)
2 Sheets—Sheet 1.

W. O. JOHNSON.
SAUSAGE CASING MACHINE.

No. 601,019. Patented Mar. 22, 1898.

Witnesses.
Inventor
W. O. Johnson
by Elliott & Hopkins
Att'ys

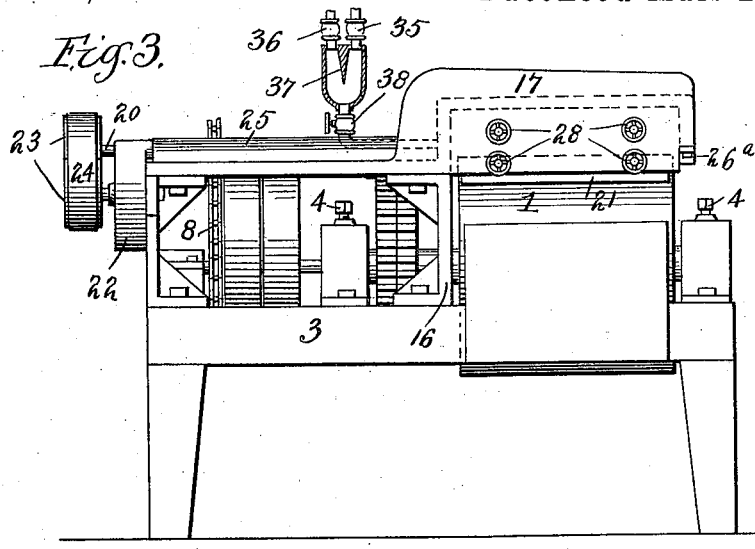
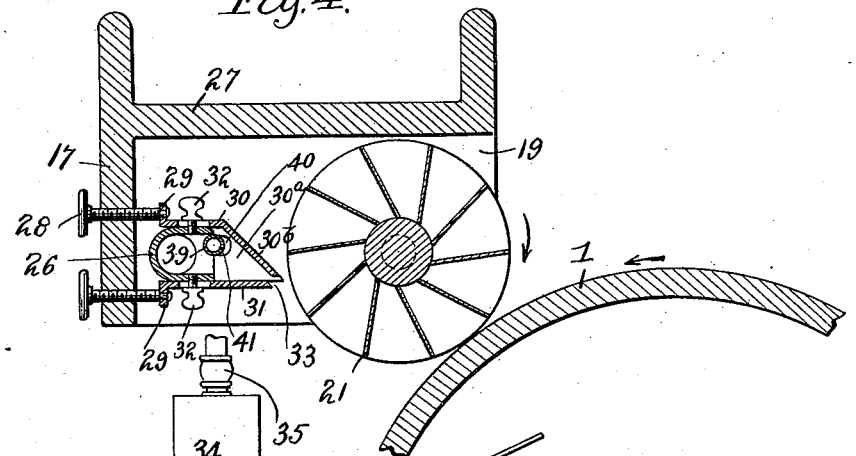
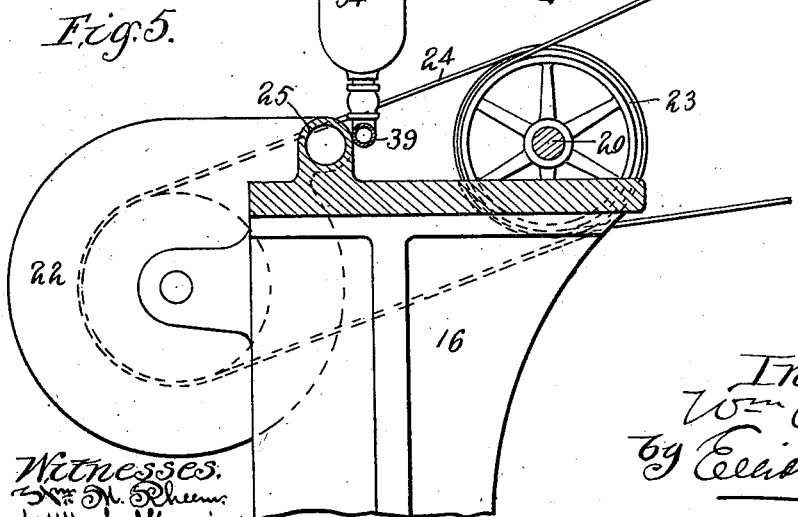

UNITED STATES PATENT OFFICE.

WILLIAM O. JOHNSON, OF CHICAGO, ILLINOIS.

SAUSAGE-CASING MACHINE.

SPECIFICATION forming part of Letters Patent No. 601,019, dated March 22, 1898.

Application filed June 5, 1897. Serial No. 639,529. (No model.)

*To all whom it may concern:*

Be it known that I, WILLIAM O. JOHNSON, a citizen of the United States, residing at Chicago, in the county of Cook and State of Illinois, have invented certain new and useful Improvements in Sausage-Casing Machines, of which the following is a full, clear, and exact specification.

My invention relates to machines for scraping or cleaning sausage-casings, and more especially to that class in which the casing is subjected to the action of a pair of revolving drums each having a number of blades or scrapers arranged around its periphery and being located with their tips or edges in juxtaposition to a supporting-drum upon which the casing rests while passing through the machine and by which the casing is held in intimate relation to the edges of the scraping-blades. In the operation of machines of this character the casing is introduced between the tips of the two revolving series of blades or scrapers and the said main drum and the two series of blades revolved in opposite directions, one series being for the purpose of scraping the casing, while the other, which is commonly termed the "clipper," is utilized for brushing shreds and particles of skin off the scraper-blades and preventing the same from winding around them. A serious defect of these devices is that the vibration of the rapidly-revolving clipper, added to the vibration caused by the revolving scrapers, causes the blades to cut or damage the casing, and this defect renders the machine useless for cleaning or scraping very thin casings with which it becomes necessary to set the edges of the scrapers exceedingly close to the supporting-drum.

The primary object of my invention is to dispense with the revolving series of blades, which I have termed the "clipper," and to provide improved and simple means for preventing the shreds of the exterior membrane from winding around the scraping-blades.

With these ends in view my invention consists in certain features of novelty in the construction, combination, and arrangement of parts by which the said objects and certain other objects hereinafter appearing are attained, all as fully described with reference to the accompanying drawings, and more particularly pointed out in the claims.

Figure 1:
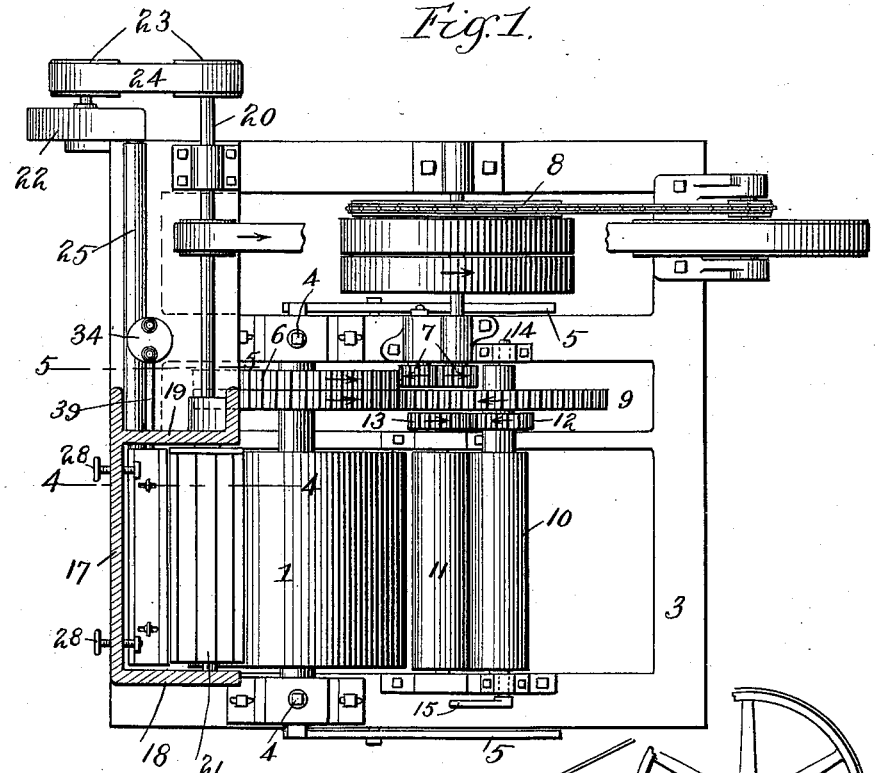
Figure 2:
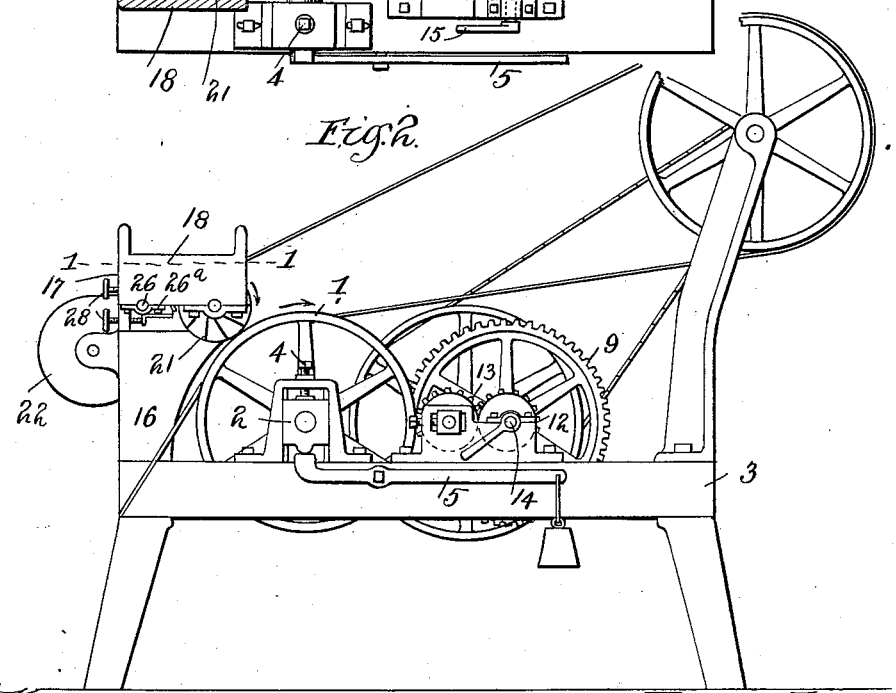

In the said drawings, Figure 1 is a plan view of my improved machine, partly in section, on the line 1 1, Fig. 2. Fig. 2 is a side elevation thereof. Fig. 3 is a front elevation, partly in vertical section. Fig. 4 is an enlarged detail transverse sectional view taken on the line 4 4, Fig. 1; and Fig. 5 is a similar section taken on the line 5 5, Fig. 1.

1 represents the main supporting drum or cylinder, journaled in suitable vertically-adjustable blocks 2, mounted upon the main frame 3, such blocks being forced upwardly against set-screws 4 by means of weighted levers 5, so as to hold the drum or cylinder 1 up to its work with a yielding pressure. The drum or cylinder 1 derives rotation in the direction of the arrow through a train of gears consisting of gear-wheel 6 on the shaft of the cylinder and a pair of pinions 7 on the shaft of the main driving-sprocket 8. The gear-wheel 6 also imparts motion to a gear-wheel 9, mounted upon the shaft of one of the feeding-rollers 10 11, which pull the casing through the machine, the roller 10 being provided with pinion 12, gearing with pinion 13 on the roller 11. The roller 12 is also mounted upon eccentric journals 14, having a crank or handle 15, whereby it may be thrown out of contact with the roller 11, when desired, in a manner well understood.

Mounted upon one end of the frame 3 and to one side of the main cylinder 1 is a standard 16, having a horizontal arm 17 projecting lengthwise of and substantially across the cylinder 1 and being provided with plates or arms 18 19 at its opposite ends, respectively, projecting toward the cylinder and serving as means for the support of the shaft 20, which carries the series of revolving scraping-blades 21. Owing to the fact that the casing is introduced between the blades 21 and cylinder 1 from the end or right-hand side of the machine, such right-hand end of the arm 17 must be supported in mid-air entirely from the opposite side, and this nature of support leaves the arm 17 so insecure at its right-hand extremity that the vibration of the rapidly-revolving clipper heretofore used, and which has heretofore been necessarily mounted in the said arm like the blades 21, has resulted in such severe vibration of the blades 21 that they damage or puncture the casing if set sufficiently close to the cylinder 1 to perform their allotted function, and in any event they skip particles of matter which they are intended to remove. In carrying out my invention, therefore, I omit the aforesaid clipper for preventing the shreds and particles of membrane from winding around the scraping-blades 21, and in its stead I employ a spray of air and water, preferably heated by means of steam, arranged to play upon the edges of the scraping-blades and to force therefrom the particles of membrane or shreds tending to wind therearound.

In constructing the invention I provide one side of the machine with a blow-fan 22 or other suitable air-forcing device driven by pulleys 23 and belt 24 from the shaft 20. The discharge-port of the blow-fan is connected by pipe or passage 25 with an open-sided elongated chamber 26, supported under a cover 27 on the arm 17 by means of a strap or box 26$^a$, the extremity of the chamber 26 being closed, as shown in Fig. 2.

28 are four set-screws passing through the arm 17 and whose extremities are swiveled in flanges 29 of two plates 30 31, each of which is connected to the open-sided chamber 26 by slots and set-screws 32, so that the plates 30 31 may be independently adjusted back and forth with reference to the scraping-blades 21 and without moving the open-sided chamber 26. The upper plate 30 is provided with end pieces 30$^a$, brought down to the plate 31, and also with a downwardly-inclining front portion 30$^b$, brought down into close proximity to the edge of the plate 31, so as to form over the open side of the chamber 26 a box-like structure having a slit or elongated aperture 33 extending throughout its length and substantially parallel with the edges of the scraping-blades 21.

34 is a cup or closed chamber for receiving water and steam or some other heating medium through a pair of pipes 35 36, respectively, connected to any suitable sources of supply, the cup being provided with a dividing-partition 37, depending thereinto, for causing the steam to descend into and heat the water in the cup. The bottom of this cup is connected by a globe-valve 38 with a longitudinal pipe 39, which extends through the side piece 19 of the arm 17 and enters the inclosure formed by the chamber 26 and the plates 30 31, the end wall or piece 30$^a$ of the plate 30 being slotted, as shown at 40, for the passage of the pipe 39 and also for the proper adjustment of the plate 30. This pipe 39 is provided in its side adjacent to the slit 33 with a number of fine perforations or discharge-jets 41, which supply a fine spray of the warmed water to the blast, discharging through the open side of the chamber 26. This spray of air and water combined is directed by the slit 33 upon the edges of the blades 21 as they rise successively past the slit 33 and thus continually force therefrom the particles of membrane or shreds carried up by the belts and tending to wind therearound. Another advantage of this means of keeping the scrapers clear of these particles is that the warmed water of the dislodging spray softens the casing and keeps it in proper condition for treatment by the scrapers.

Having thus described my invention, what I claim as new, and desire to secure by Letters Patent, is—

1. A machine for the purpose described having in combination a revolving scraper, and a fluid spray directed downwardly toward the point of introduction of the casing and tangentially against the scraper in a direction opposite to that in which the scraper revolves, substantially as set forth.

2. A machine for the purpose described having in combination a revolving scraper, and a spray of heated liquid directed toward the casing and tangentially against the edge of the scraper and in a direction opposite to the direction in which said edge moves, substantially as set forth.

3. A machine for the purpose described having in combination means for scraping the casing, an air-blast directed toward the edge of the scraping means and in a direction the reverse of the movement thereof, and means for supplying a liquid to said blast, substantially as set forth.

4. A machine for the purpose described having in combination means for scraping the casing, an open-sided air-chamber extending lengthwise thereof, adjustable plates forming a discharge-slit contiguous to said scraping means, air-forcing tubes connected with said open-sided chamber and a water-pipe arranged contiguous to the blast from said open-sided chamber and having discharge-apertures, substantially as set forth.

5. A machine for the purpose described having in combination means for scraping the casing, an air-blast pipe arranged contiguous to said means, means for directing the blast from said pipe against said scraper, a pipe or passage having discharge-apertures arranged contiguous to the blast from said air-pipe, and means for supplying steam and water to the last said pipe, substantially as set forth.

WILLIAM O. JOHNSON.

Witnesses:
EDNA B. JOHNSON,
F. A. HOPKINS.